US008372936B2

(12) United States Patent
Mizuno et al.

(10) Patent No.: US 8,372,936 B2
(45) Date of Patent: Feb. 12, 2013

(54) SILICONE-TYPE PRESSURE-SENSITIVE ADHESIVE COMPOSITION, PRESSURE-SENSITIVE ADHESIVE SHEET, AND SILICONE RUBBER LAMINATE

(75) Inventors: Haruna Mizuno, Chiba (JP); Seiji Hori, Chiba (JP); Takateru Yamada, Ichihara (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 189 days.

(21) Appl. No.: 12/810,584

(22) PCT Filed: Dec. 25, 2008

(86) PCT No.: PCT/JP2008/073952
§ 371 (c)(1),
(2), (4) Date: Jun. 25, 2010

(87) PCT Pub. No.: WO2009/084726
PCT Pub. Date: Jul. 9, 2009

(65) Prior Publication Data
US 2010/0285312 A1    Nov. 11, 2010

(30) Foreign Application Priority Data

Dec. 27, 2007 (JP) .................. 2007-336409

(51) Int. Cl.
*C08G 77/12* (2006.01)
(52) U.S. Cl. ............................ 528/31; 528/32
(58) Field of Classification Search ........... 528/31, 528/32
See application file for complete search history.

(56) References Cited

U.S. PATENT DOCUMENTS

| 4,438,039 | A | 3/1984 | Beers et al. |
| 5,696,209 | A | 12/1997 | King et al. |
| 2006/0293445 | A1 | 12/2006 | Araki et al. |

FOREIGN PATENT DOCUMENTS

| EP | 0664328 A1 | 7/1995 |
| EP | 0771862 A1 | 5/1997 |
| JP | 57047353 A | 3/1982 |
| JP | 63022886 A | 1/1988 |
| JP | 07-011228 A | 1/1995 |
| JP | 09-118871 A | 5/1997 |
| JP | 2002-356616 A | 12/2002 |
| JP | 2003-049072 A | 2/2003 |
| JP | 2005-175119 A | 6/2005 |
| JP | 2006-335899 A | 12/2006 |
| JP | 2007-002088 A | 1/2007 |
| JP | 2007-297598 A | 11/2007 |
| JP | 2007-327045 A | 12/2007 |

OTHER PUBLICATIONS

English language equivalent for JP 57047353 extracted from espacenet.com database, dated Oct. 4, 2010, 20 pages.
English language abstract for JP 63022886 extracted from espacenet.com database, dated Sep. 28, 2010, 8 pages.
English language translation and abstract for JP 07-011228 extracted from PAJ database, dated Oct. 4, 2010, 36 pages.
English language translation and abstract for JP 09-118871 extracted from PAJ database, dated Oct. 4, 2010, 43 pages.
English language translation and abstract for JP 2002-356616 extracted from PAJ database, dated Oct. 4, 2010, 48 pages.
English language translation and abstract for JP 2003-049072 extracted from PAJ database, dated Oct. 4, 2010, 51 pages.
English language translation and abstract for JP 2005-175119 extracted from PAJ database, dated Oct. 4, 2010, 42 pages.
English language translation and abstract for JP 2006-335899 extracted from PAJ database, dated Oct. 4, 2010, 46 pages.
English language translation and abstract for JP 2007-002088 extracted from PAJ database, dated Oct. 4, 2010, 39 pages.
English language translation and abstract for JP 2007-292598 extracted from PAJ database, dated Oct. 4, 2010, 46 pages.
English language translation and abstract for JP 2007-327045 extracted from PAJ database, dated Oct. 4, 2010, 38 pages.
PCT International Search Report for PCT/JP2008/073952, dated Apr. 14, 2009, 3 pages.

*Primary Examiner* — Kuo-Liang Peng
(74) *Attorney, Agent, or Firm* — Howard & Howard Attorneys PLLC

(57) ABSTRACT

A silicone-type pressure-sensitive adhesive composition comprising (A) 100 weight parts of organopolysiloxane condensation reaction product that has at least two alkenyl groups and that is yielded by a condensation reaction between (a) hydroxyl-functional diorganopolysiloxane and (b) organopolysiloxane resin, (B) organohydrogenpolysiloxane having at least two silicon-bonded hydrogen atoms in the molecule, in an amount sufficient to provide from 1 to 200 silicon-bonded hydrogen atoms with reference to all the alkenyl groups in the composition, (C) an organotitanium compound, at from 0.1 to 20 weight parts, and (D) a platinum catalyst in a catalytic quantity.

16 Claims, No Drawings

SILICONE-TYPE PRESSURE-SENSITIVE ADHESIVE COMPOSITION, PRESSURE-SENSITIVE ADHESIVE SHEET, AND SILICONE RUBBER LAMINATE

RELATED APPLICATIONS

This application claims priority to and all the advantages of International Patent Application No. PCT/JP2008/073952, filed on Dec. 25, 2008, which claims priority to Japanese Patent Application No. JP2007-336409, filed on Dec. 27, 2007.

TECHNICAL FIELD

The present invention relates to an addition reaction-curing silicone-type pressure-sensitive adhesive composition and to a pressure-sensitive adhesive sheet that has a pressure-sensitive adhesive layer formed by the cure of this composition. The present invention also relates to a silicone rubber laminate comprising a sheet-form substrate, a pressure-sensitive adhesive layer formed by the cure of the aforementioned silicone-type pressure-sensitive adhesive composition, and silicone rubber.

BACKGROUND ART

Silicone-type pressure-sensitive adhesive compositions characteristically have better electrical insulation characteristics, a better resistance to heat and cold, and a better tacky adhesiveness for a variety of adherends than do acrylic-type pressure-sensitive adhesive compositions and rubber-type pressure-sensitive adhesive compositions and for this reason are employed for applications such as heat-resistant tapes, electrical insulating tapes, heat-seal tapes, masking tapes for plating applications, masking tapes for heat-treatment applications, and so forth. These silicone-type pressure-sensitive adhesive compositions are categorized in accordance with their curing mechanism into addition reaction-curing grades, condensation reaction-curing grades, and peroxide-curing grades. Among these, the addition reaction-curing grades are well suited for use because they cure rapidly upon standing at room temperature or upon the application of heat and do so without producing by-products.

A silicone-type pressure-sensitive adhesive (1) is disclosed in Patent Reference 1 as an example of an addition reaction-curing silicone-type pressure-sensitive adhesive composition. This silicone-type pressure-sensitive adhesive (1) comprises (A1) diorganopolysiloxane having alkenyl at both molecular chain terminals (viscosity of at least 500,000 cP),
(B1) organopolysiloxane resin comprising the $R_3SiO_{1/2}$ unit (R in the formula is alkyl, alkenyl, or the hydroxyl group) and $SiO_{4/2}$ unit,
(C1) organopolysiloxane having at least two silicon-bonded hydrogens per molecule {in a quantity that provides from 1 to 20 silicon-bonded hydrogens in component (C1) per alkenyl in component (A1)},
(D1) a platinum catalyst, and
(E1) organic solvent.

However, such an addition reaction-curing silicone-type pressure-sensitive adhesive exhibits poor tackiness for silicone rubber and readily comes unstuck therefrom.

With the intention of improving the tacky adhesion for silicone rubber, a composition (1) is disclosed in Patent Reference 2, which comprising (A) chain-form organopolysiloxane that has at least two vinyl groups in terminal position and/or pendant position, and/or chain-form organopolysiloxane that has silanol in terminal position and that may or may not have vinyl in pendant position,
(B) silanol-functional organopolysiloxane comprising the triorganosiloxy unit and $SiO_2$ unit wherein the former-to-latter molar ratio is in the range from 0.5 to 1.2,
(C) organohydrogenpolysiloxane that contains at least two silicon-bonded hydrogen atoms,
(D) an organosilicon compound that contains the B—O—Si bond, and
(E) a platinum catalyst.

And a composition (2) is provided in Patent Reference 2, which comprising chain-form organopolysiloxane having silanol in terminal position, component (B), component (D), and organoperoxide.

These silicone-type pressure-sensitive adhesives characteristically comprise an organosilicon compound that has the B—O—Si bond in each molecule and provides an improved tackiness for silicone rubber. However, the organosilicon compound is the reaction product of boric acid with a silane or siloxane, and few such compounds are commercially available or easy to be acquired. As a consequence, this has led to demand for a silicone-type pressure-sensitive adhesive that is suitable for mass production at an industrial level and that provides additional improvements in the tacky adhesion for silicone rubber.

On the other hand, the silicone-type pressure-sensitive adhesive composition (3) provided in Patent Reference 3 comprises (A) organopolysiloxane yielded by the partial condensation of
  (a) diorganopolysiloxane gum in which 10 to 80 mol % of the molecular chain end groups are alkenyl and the remainder is silicon-bonded hydroxyl groups
  with
  (b) organopolysiloxane that has an average of at least one silicon-bonded hydroxyl group or alkoxyl group in the molecule and that is represented by the average unit formula $(R^1{}_3SiO_{1/2})_x(SiO_{4/2})_{1.0}$ ($R^1$ is hydrocarbyl group and x is 0.5 to 1.0)
  under the effect of
  (c) an amine compound that has a boiling point at ambient pressure of −10 to 200° C.;
(B) organopolysiloxane that has an average of at least two silicon-bonded hydrogens in each molecule; and
(C) a platinum catalyst.

However, the silicone-type pressure-sensitive adhesive described in Patent Reference 3 does not exhibit a sufficient adhesive strength for silicone rubber. Moreover, when a pressure-sensitive tape or tacky tape having a silicone-type pressure-sensitive adhesive layer yielded by the cure of this adhesive on a tape is exposed to high temperatures while applied on an adherend, a sticky residue is produced when this pressure-sensitive adhesive tape or tacky tape is then peeled off.

Organotitanium compounds, on the other hand, are known as curing catalysts for room temperature-curable silicone rubber compositions (for example, Patent References 4 to 6) and are also easily acquired on an industrial basis. These organotitanium compounds are exemplified by tetraalkoxytitanium, titanium complexes comprising titanium-acetylacetonate ligand, and titanium complexes comprising titanium-alkyl acetylacetate ligand.

Organotitanium compounds are also known as adhesion promoters for addition reaction-curing silicone rubber compositions that contain silica and are added with the goal of improving the adhesive strength for a variety of substrates (for example, Patent References 7 to 11). While the adhesive strength is increased when these organotitanium compounds are used as an additive for an addition reaction-curing silicone-type pressure-sensitive adhesive that will be converted into a thin layer, a sticky residue is produced on the adhered surface when an adhesive layer comprising such a composition is bonded with an adherend, exposed to high temperatures, and then peeled off.

In view of the preceding, there has been some demand for a silicone-type pressure-sensitive adhesive that, through its disposition as a pressure-sensitive adhesive layer on an organic resin that has been separately cured from a target adherend, can as necessary bring about strong adhesion by the organic resin to silicone rubber, and that even after application of the adherends and exposure to high temperatures enables, as the need arises, facile peeling with the production of almost no sticky residue on either adherend.

PATENT REFERENCES

[Patent Reference 1] JP 63-022886 A
[Patent Reference 2] JP 07-011228 A
[Patent Reference 3] JP 09-118871 A
[Patent Reference 4] JP 63-042942 B
[Patent Reference 5] JP 2002-356616 A
[Patent Reference 6] JP 2003-049072 A
[Patent Reference 7] JP 2005-175119 A
[Patent Reference 8] JP 2006-335899 A
[Patent Reference 9]. JP 2007-002088 A
[Patent Reference 10] JP 2007-297598 A
[Patent Reference 11] JP 2007-327045 A

DISCLOSURE OF INVENTION

Problems to Be Solved by the Invention

The present invention was pursued in order to solve the problems described above. A first object of the present invention is to provide a silicone-type pressure-sensitive adhesive composition by using easy-to-obtain additives, that exhibits a high adhesive strength for silicone rubber, that does not produce voids or a sticky residue when exposed to high temperatures after the application of the adherend, and that can also be easily peeled from silicone rubber. A second object of the present invention is to provide a pressure-sensitive adhesive sheet that has a pressure-sensitive adhesive layer formed by the cure of the aforementioned composition. A third object of the present invention is to provide a laminate in which a sheet-form substrate and silicone rubber are adhered by a pressure-sensitive adhesive layer formed by the cure of the aforementioned composition.

Means Solving the Problems

The present inventors discovered that the previously described problems could be solved by a silicone-type pressure-sensitive adhesive composition comprising the components (A) to (D) described as below and by a pressure-sensitive adhesive sheet that has a pressure-sensitive adhesive layer formed by the cure of this silicone-type pressure-sensitive adhesive composition.

(A) 100 weight parts of organopolysiloxane condensation reaction product that has at least two $C_{2-10}$ alkenyl groups in the molecule and that is yielded by a condensation reaction between the following components (a) and (b) in the presence of component (c)

(a) 20 to 80 weight parts of diorganopolysiloxane that has at least one hydroxyl group in molecular chain terminal position and that is represented by the following average structural formula (1)

average structural formula (1):

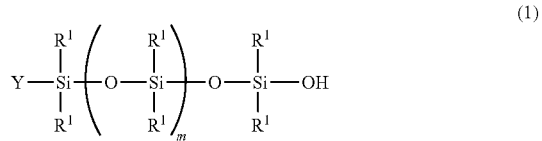

(in the formula, the $R^1$ groups independently designates $C_{1-10}$ unsubstituted or substituted monovalent hydrocarbyl; Y is a group selected from the hydroxyl group (—OH) or $R^1$; and m is a number in the range from 2000 to 10000)

(b) 80 to 20 weight parts of organopolysiloxane resin substantially comprising the $XR^2{}_2SiO_{1/2}$ unit (in the formula, X is a hydrolyzable group selected from the hydroxyl group or $C_{2-6}$ alkoxy groups and the $R^2$ groups independently designate $C_{1-10}$ unsubstituted or substituted monovalent hydrocarbyl groups), $R^2{}_3SiO_{1/2}$ unit (the $R^2$ groups are as previously defined), and $SiO_{4/2}$ unit (wherein the sum of component (a) and component (b) is 100 weight parts and at least two among all of the $R^1$ and $R^2$ groups are $C_{2-10}$ alkenyl groups)

(c) a catalyst that promotes the condensation reaction, in a catalytic quantity;

(B) an organohydrogenpolysiloxane that contains at least two silicon-bonded hydrogen atoms in the molecule, in an amount sufficient to provide from 1 to 200 silicon-bonded hydrogen atoms with reference to all the alkenyl groups present in the composition;

(C) an organotitanium compound, at from 0.1 to 20 weight parts; and (D) a platinum catalyst in a catalytic quantity.

That is, the objects cited above are achieved by

"[1] A silicone-type pressure-sensitive adhesive composition comprising the following components (A), (B), (C), and (D):

(A) 100 weight parts of organopolysiloxane condensation reaction product that has at least two $C_{2-10}$ alkenyl groups in the molecule and that is yielded by a condensation reaction between the following components (a) and (b) in the presence of component (c)

(a) 20 to 80 weight parts of diorganopolysiloxane that has at least one hydroxyl group in molecular chain terminal position and that is represented by the following average structural formula (1)

average structural formula (1):

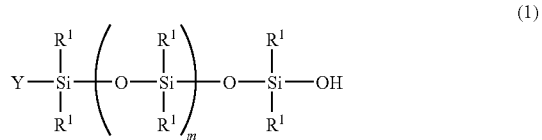

(in the formula, the $R^1$ groups independently represent $C_{1-10}$ unsubstituted or substituted monovalent hydrocarbyl; Y is a group selected from the hydroxyl group (—OH) or $R^1$; and m is a number in the range from 2000 to 10000)

(b) 80 to 20 weight parts of organopolysiloxane resin substantially comprising the $XR^2{}_2SiO_{1/2}$ unit (in the formula, X is a hydrolyzable group selected from the hydroxyl group or $C_{2-6}$ alkoxy groups and the $R^2$ groups independently represent $C_{1-10}$ unsubstituted or substituted monovalent hydrocarbyl groups), $R^2{}_3SiO_{1/2}$ unit (the $R^2$ groups are as previously defined), and $SiO_{4/2}$ unit (wherein the sum of component (a) and component (b) is 100 weight parts and at least two among all of the $R^1$ and $R^2$ groups are $C_{2-10}$ alkenyl groups)

(c) a catalyst that promotes the condensation reaction, in a catalytic quantity;

(B) an organohydrogenpolysiloxane that contains at least two silicon-bonded hydrogen atoms in the molecule, in an amount sufficient to provide from 1 to 200 silicon-bonded hydrogen atoms with reference to all the alkenyl groups present in the composition;

(C) an organotitanium compound, at from 0.1 to 20 weight parts; and (D) a platinum catalyst in a catalytic quantity.

[2] The silicone-type pressure-sensitive adhesive composition of [1], that further comprises (E) 0.1 to 20 weight parts of organopolysiloxane that is represented by average structural formula (2) and that has $C_{2-10}$ alkenyl or the hydroxyl group at the molecular chain terminals average structural formula (2):

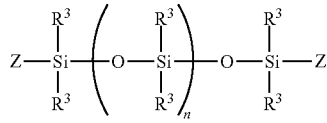

(2)

(in the formula, the $R^3$ groups independently represent $C_{1-10}$ unsubstituted or substituted monovalent hydrocarbyl; Z is a group selected from the hydroxyl group or $C_{2-10}$ alkenyl; and n is a number in the range from 0 (inclusive) to less than 2000).

[3] The silicone-type pressure-sensitive adhesive composition of [1] or [2], that further comprises (F) organic solvent, in an amount such that the content of components (A) to (E) in the composition is in the range from at least 30 weight % to less than 100 weight %.

[4] The silicone-type pressure-sensitive adhesive composition of [1], wherein component (C) is an organotitanium compound represented by the following general formula (3) or general formula (4)

general formula (3): $[Ti(OR^a)_p(R^b\text{-}acac)_{4-p}]$ (3)

(in the formula, $R^a$ is a monovalent organic group, $R^b$-acac is the acetylacetonate ligand represented by $C_5H_7O_2$ or is an alkyl acetoacetate-type ligand represented by $C_4H_5O_2OC_qH_{2q+1}$ (q in the formula is a number in the range from 1 to 10), and p is a number in the range from 0 to 4)

general formula (4): $R^aO\text{—}[Ti(OR^a)_r(OH)_{2-r}O]_s\text{—}R^a$ (4)

(in the formula, $R^a$ is a monovalent organic group, r is a number from 0 to 2, and s is a positive number with a value of at least 2).

[5] The silicone-type pressure sensitive adhesive composition of [4], wherein component (C) is an organotitanium compound characterized in that $R^a$ in general formula (3) and general formula (4) is a monovalent organic group selected from the group consisting of $C_{1-20}$ alkyl, $C_{6-20}$ aryl, $C_{7-20}$ aralkyl, and the monovalent organic groups represented by the following structural formulas (5) to (8)

structural formula (5):

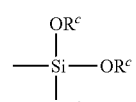

(5)

structural formula (6):

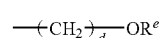

(6)

structural formula (7):

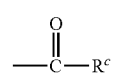

(7)

structural formula (8):

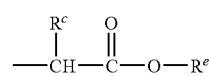

(8)

(in the formulas, $R^c$ is a group selected from $C_{1-20}$ alkyl, $C_{6-20}$ aryl, and $C_{7-20}$ aralkyl; $R^e$ is a group selected from the hydrogen atom, $C_{1-20}$ alkyl, $C_{6-20}$ aryl, and $C_{7-20}$ aralkyl; and d is a number in the range from 1 to 20).

[6] The silicone-type pressure-sensitive adhesive composition of [2], wherein component (E) is organopolysiloxane that contains at least one $C_{2-10}$ alkenyl group in the molecule.

[7] A pressure-sensitive adhesive sheet comprising a sheet-form substrate and a pressure-sensitive adhesive layer formed thereon by the cure of a silicone-type pressure-sensitive adhesive composition according to any of [1] to [6].

[8] A silicone rubber laminate comprising a pressure-sensitive adhesive layer formed by the cure of a silicone-type pressure-sensitive adhesive composition according to any of [1] to [6], a sheet-form substrate, and silicone rubber.

[9] The silicone rubber laminate of [8], characterized in that the sheet-form substrate is paper or a plastic film and the silicone rubber has a hardness (hardness measured with a type A durometer in accordance with JIS K 6253) in the range of 30 to 90."

Effects of the Invention

The present invention provides a silicone-type pressure-sensitive adhesive composition that uses an organotitanium compound, which is an easily acquirable additive; that exhibits a high adhesive strength to silicone rubber; that does not produce voids or a sticky residue when exposed to high temperatures after the application of the adherend; and that can also be easily peeled from silicone rubber. The present invention further provides a pressure-sensitive adhesive sheet that has a pressure-sensitive adhesive layer formed by the cure of the aforementioned composition. The present invention further provides a laminate in which a sheet-form substrate and silicone rubber are adhered at a high adhesive strength by a pressure-sensitive adhesive layer formed by the cure of the aforementioned composition.

BEST MODE FOR CARRYING OUT THE INVENTION

The silicone-type pressure-sensitive adhesive composition of the present invention is described in detail first. The silicone-type pressure-sensitive adhesive composition of the present invention is an addition reaction-curing silicone-type pressure-sensitive adhesive composition that cures under the effect of the platinum catalyst (D), that is characteristically based on an organopolysiloxane partial condensation reaction product having at least two alkenyl groups in the molecule (component (A)) and organohydrogenpolysiloxane (component (B)), and that characteristically employs an organotitanium compound (component (C)) as an additive. The silicone-type pressure-sensitive adhesive composition of the present invention preferably also contains a reactive organopolysiloxane (component (E)), organic solvent (component (F)), and a curing reaction inhibitor (component (G)).

Component (A) is the base component of the silicone-type pressure-sensitive adhesive composition of the present invention and is an organopolysiloxane condensation reaction product that contains at least two $C_{2-10}$ alkenyl groups in the molecule and that is formed by a condensation reaction between the following components (a) and (b) in the presence of component (c).
(a) 20 to 80 weight parts of diorganopolysiloxane that has at least one hydroxyl group in molecular chain terminal position and that is represented by the following average structural formula (1)

average structural formula (1):

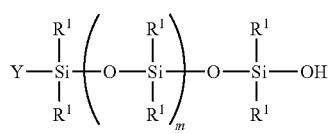

(1)

(in the formula, the $R^1$ groups independently designate $C_{1-10}$ unsubstituted or substituted monovalent hydrocarbyl; Y is a group selected from the hydroxyl group (—OH) or $R^1$; and m is a number in the range from 2000 to 10000)
(b) 80 to 20 weight parts of organopolysiloxane resin substantially comprising the $XR^2{}_2SiO_{1/2}$ unit (in the formula, X is a hydrolyzable group selected from the hydroxyl group or $C_{2-6}$ alkoxy groups and the $R^2$ groups independently designate $C_{1-10}$ unsubstituted or substituted monovalent hydrocarbyl groups), $R^2{}_3SiO_{1/2}$ unit (the $R^2$ groups are as previously defined), and $SiO_{4/2}$ unit (wherein the sum of component (a) and component (b) is 100 weight parts and at least two among all of the $R^1$ and $R^2$ groups are $C_{2-10}$ alkenyl groups) (c) a catalyst that promotes the condensation reaction, in a catalytic quantity.

Component (a) is at least one diorganopolysiloxane that has high degree of polymerization and is represented by the preceding general formula (1), that has at least one hydroxyl group in molecular chain terminal position. The degree of polymerization m is in the range from 2000 to 10000. Component (a) forms the organopolysiloxane condensation reaction product (component (A)) through a condensation reaction with the hydrolyzable groups in component (b) in the presence of component (c).

The $R^1$ groups in the formula independently designate $C_{1-10}$ unsubstituted or substituted monovalent hydrocarbyl and can be specifically exemplified by alkyl such as methyl, ethyl, propyl, isopropyl, butyl, isobutyl, tert-butyl, pentyl, neopentyl, hexyl, heptyl, octyl, nonyl, decyl, dodecyl, and so forth; aryl such as phenyl, tolyl, xylyl, naphthyl, biphenyl, and so forth; cycloalkyl such as cyclopentyl, cyclohexyl, cycloheptyl, and so forth; aralkyl groups such as benzyl, phenylethyl, phenylpropyl, methylbenzyl, and so forth; $C_{2-10}$ alkenyl such as vinyl, allyl, butenyl, pentenyl, hexenyl, cyclohexenyl, and so forth; and groups yielded by the substitution of at least one hydrogen atom in the preceding monovalent hydrocarbyl groups with, for example, a halogen atom (e.g., the fluorine atom, chlorine atom, or bromine atom), the cyano group, and so forth, as exemplified by chloromethyl, 2-bromoethyl, 3-chloropropyl, 3,3,3-trifluoropropyl, chlorophenyl, fluorophenyl, cyanoethyl, 3,3,4,4,5,5,6,6,6-nonafluorohexyl, and so forth. $R^1$ is preferably methyl, phenyl, vinyl, or hexenyl from an industrial perspective. When component (b) lacks alkenyl, at least two among all of the $R^1$ groups must then be $C_{2-10}$ alkenyl. In addition, at least two among all of the $R^1$ groups are preferably $C_{2-10}$ alkenyl even when component (b) has alkenyl in the molecule. From an industrial perspective, methyl comprises preferably at least 70% of all the $R^1$ groups and particularly preferably at least 90% of all the $R^1$ groups. Y is selected from the hydroxyl group (—OH) or $R^1$ wherein the hydroxyl group is particularly preferred. m is a number in the range from 2000 to 10000 wherein a number in the range from 3000 to 10000 is particularly preferred. When an m is less than the cited lower limit, the adhesive strength for silicone rubber may be inadequate or, conversely, permanent adhesion to silicone rubber may occur and facile peeling cannot be carried out. The viscosity of this component (a) at 25° C. ranges from 1,000,000 mPa·s to that of a gum. Component (a) may be a mixture of two or more species of said diorganopolysiloxane.

Component (a) in the present invention particularly preferably comprises at least one species of diorganopolysiloxane as represented by structural formula (1-1) below that has the hydroxyl group at both molecular chain terminals and that has $C_{2-10}$ alkenyl in pendant position on the molecular chain.

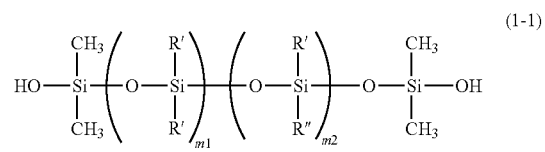

(1-1)

In the preceding formula, R' is a group selected from $C_{1-20}$ alkyl, $C_{6-20}$ aryl, and $C_{7-20}$ aralkyl; R" is $C_{2-10}$ alkenyl; (m1+m2) is a number in the range from 2000 to 10000; and m2 is a positive number. In the present invention, m2 is particularly preferably at least 2 and the range from 3000 to 10000 is particularly preferred for (m1+m2). In addition, the diorganopolysiloxane with formula (I-1) preferably satisfies the relationship 0<m2/(m1+m2) 0.05. When the value of m2/(m1+m2) is larger than 0.05, the pressure-sensitive adhesive layer formed by the cure of the composition of the present invention exhibits a low adhesive strength for silicone rubber and cohesive failure and/or defective adhesion may appear in some cases. From an industrial perspective, methyl comprises preferably at least 70% of all the R' groups and particularly preferably at least 90% of all the R' groups. Again from an industrial perspective, R" is preferably vinyl or hexenyl group.

Component (b) is organopolysiloxane resin that consists essentially of the $XR^2{}_2SiO_{1/2}$ unit, $R^2{}_3SiO_{1/2}$ unit, and $SiO_{4/2}$ unit and that has the hydrolyzable group X in the molecule. X is a hydrolyzable group selected from the hydroxyl group or $C_{2-6}$ alkoxy, wherein the hydroxyl group is preferred. The $R^2$ groups independently designate $C_{1-10}$ substituted or unsubstituted monovalent hydrocarbyl and are specifically exemplified by $C_{1-10}$ alkyl such as methyl and so forth; aryl such as phenyl and so forth; cycloalkyl such as cyclopentyl and so forth; aralkyl such as benzyl and so forth; $C_{2-10}$ alkenyl such as vinyl, allyl, butenyl, pentenyl, hexenyl, cyclohexenyl, and so forth; and groups yielded by the substitution of at least one hydrogen atom in the preceding monovalent hydrocarbyl groups with, for example, a halogen atom (for example, the fluorine atom, chlorine atom, or bromine atom) or the cyano group.

Viewed from an industrial perspective, $R^2$ is preferably a group selected from the group consisting of methyl, ethyl, propyl, phenyl, vinyl, and hexenyl. Again viewed from an industrial perspective, methyl preferably constitutes at least 90% of all the $R^2$ groups. When, however, component (a) lacks alkenyl, at least two among all the $R^2$ groups must then be $C_{2-10}$ alkenyl.

Component (b) of the present invention is an organopolysiloxane resin that has the hydrolyzable group X in the molecule; the X content is preferably 0.5 to 10 weight % with reference to the organopolysiloxane resin as a whole. In addition, the molar ratio between the "M unit" (=the $XR^2{}_2SiO_{1/2}$ unit and $R^2{}_3SiO_{1/2}$ unit) and the "Q unit" (=the $SiO_{4/2}$ unit) is preferably in the range of 1:0.6 to 1:1.0 using the M unit as reference.

A methylpolysiloxane resin that consist essentially of the $(OH)(CH_3)_2SiO_{1/2}$ unit, $(CH_3)_3SiO_{1/2}$ unit, and $SiO_{4/2}$ unit and that contains 0.5 to 10 weight % of hydroxyl group in the molecule is most preferably used for component (b) in the present invention.

Component (A) is the product of a condensation reaction between components (a) and (b), and, taking the sum of components (a) and (b) as 100 weight parts, components (a) and (b) must be reacted at the ratio 20:80 to 80:20 and are preferably reacted at the ratio 30:70 to 70:30. The adhesive strength for silicone rubber may be insufficient when the amount of component (b) is less than the cited lower limit. When the component (b) addition exceeds the cited upper limit, a silicone residue essentially composed of component (b) may remain attached to a portion of the adherend in instances where exposure to high temperatures has occurred after application of the adherend.

Component (c) is a catalyst that promotes the condensation reaction and comprises at least one silanol condensation catalyst. Component (c) is added in order to promote the condensation reaction between the hydroxyl in component (a) and the hydrolyzable groups in component (b).

This condensation reaction-promoting catalyst can be one or two or more condensation catalysts such as an acid, base, metal salt of an organic acid, and so forth; however, condensation catalysts selected from aqueous ammonia, sodium hydroxide, barium hydroxide, amines, the carboxylic acid salts of organic amines, quaternary ammonium salts, and carboxylic acids and the metal salts of carboxylic acids are preferred. Amines suitable for use as component (c) in the present invention can be exemplified by primary amines such as methylamine, ethylamine, propylamine, hexylamine, butanolamine, and butylamine; secondary amines such as dimethylamine, diethylamine, diethanolamine, dipropylamine, dibutylamine, dihexylamine, ethylamylamine, imidazole, and propylhexylamine; tertiary amines such as trimethylamine, triethylamine, tripropylamine, tripropanolamine, pyridine, N-methylimidazole, and methylpropylhexylamine; and amine compounds and salts thereof, e.g., dodecylamine phosphate, tetramethylguanidine, and diazabicyclononane. Carboxylic acid salts of organic amines that are suitable for use as component (c) in the present invention can be exemplified by diethylammonium acetate, butylammonium octoate, n-hexylammonium 2-ethylhexanoate, and trimethylammonium laurate. Examples of suitable quaternary ammonium salts are tetramethylammonium acetate, methylethyldibutylammonium chloride, dioctadecyldimethylammonium chloride, and tetramethylguanidine 2-ethylhexanoate. Suitable carboxylic acids can be exemplified by acetic acid, propionic acid, butanoic acid, formic acid, stearic acid, tetradecanoic acid, hexadecanoic acid, dodecanoic acid, decanoic acid, 3,6-dioxaheptanoic acid, and 3,6,9-trioxadecanoic acid. Metal carboxylate salts in which the metal is selected from the group consisting of Li, Na, K, Ce, and Ca can also be suitably employed, such as potassium formate and potassium acetate. The carboxylic acid salts of organic amines and the quaternary ammonium salts are condensation reaction-promoting catalysts preferred for the present invention, and the use of tetramethylguanidine 2-ethylhexanoate is particularly preferred.

Component (c) is added in a catalytic quantity and is incorporated generally at 0.01 to 10 weight parts and more preferably at 0.1 to 2 weight parts, in each case per 100 weight parts for the total quantity of components (a) and (b). The condensation reaction is slow at less than 0.01 weight part. At above 10 weight parts, the objects of the present invention are impaired because the catalyst itself—or components originating from the catalyst—may remain on the adherend in those instances where exposure to high temperatures has occurred after the application of the adherend.

In the usual method of producing component (A) of the present invention, i.e., the organopolysiloxane condensation reaction product that has at least two $C_{2-10}$ alkenyl groups in the molecule, components (a) and (b) are mixed to homogeneity, optionally in an organic solvent; component (c) is then incorporated into this system; and a partial condensation is carried out.

The addition of organic solvent is optional, but the partial condensation of components (a) and (b) can be proceeded rapidly through the use of organic solvent. This organic solvent should have the ability to dissolve components (a) and (b) and should not inhibit the condensation reaction between the hydroxyl groups in component (a) and the hydrolyzable groups in component (b), and can be exemplified by aromatic solvents such as toluene, xylene, and so forth; aliphatic solvents such as hexane, heptane, and so forth; and ketone solvents such as acetone, methyl ethyl ketone, methyl isobutyl ketone, and so forth; wherein aromatic solvents such as toluene, xylene, and so forth are particularly preferred.

The partial condensation reaction between components (a) and (b) proceeds even at room temperature, but the system is preferably heated, to a degree such that component (c) does not undergo evaporation, in order to run this partial condensation rapidly; in specific terms, the system is preferably heated to 50 to 70° C. The progress of the partial condensation can be checked based on the disappearance of the silicon-bonded hydroxyl group as followed by infrared spectroscopic analysis or $^{29}Si$-nuclear magnetic resonance spectroscopic analysis of the reaction product. The progress of this partial condensation can also be conveniently checked based on the increase in the viscosity of this system. After the partial condensation of components (a) and (b) has been carried out, component (c) is preferably distilled out by heating the system. Component (c) may be distilled from this system, for example, by heating the system to at least the boiling point of component (c), and/or by reducing the pressure in the system, and/or by passing an inert gas (e.g., nitrogen, helium, argon, and so forth) through the system and distilling component (c) out along with the inert gas.

The component (A) of the present invention is the organopolysiloxane condensation reaction product yielded by the partial condensation of components (a) and (b) according to the method described above, but unreacted component (a) and/or component (b) that did not undergo partial condensation may be present to some degree in this organopolysiloxane. Moreover, this organopolysiloxane may contain the organic solvent used during the partial condensation.

Component (B) is organohydrogenpolysiloxane that has at least two silicon-bonded hydrogen atoms in the molecule and is a crosslinker for the silicone-type pressure-sensitive adhesive composition of the present invention. Thus, a pressure-sensitive adhesive layer is formed to be the cured layer by a hydrosilylation reaction between the silicon-bonded hydrogen atoms in component (B) and the alkenyl present in component (A) in the inventive composition and preferably present in components (A) and (E).

The straight-chain organohydrogenpolysiloxane represented by the following structural formula (12) is particularly preferred as component (B).

structural formula (12):

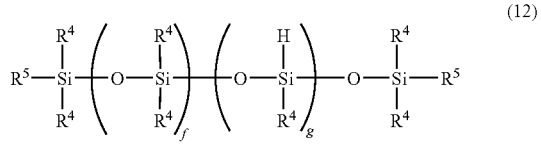

(12)

Each $R^4$ in the formula independently designates substituted or unsubstituted monovalent hydrocarbyl (excluding alkenyl) and can be exemplified by alkyl such as methyl, ethyl, propyl, butyl, hexyl, and so forth; aryl such as phenyl, tolyl, and so forth; aralkyl such as benzyl, phenethyl, and so forth; as well as chloromethyl, 3-chloropropyl, and 3,3,3-trifluoropropyl. Methyl and phenyl are particularly preferred among the preceding. $R^5$ is a group selected from silicon-bonded hydrogen and $R^4$.

In this component (B) of the present invention, f is a positive integer and g is an integer with a value of at least 2, and f and g preferably satisfy the relationship $5 \leqq (f+g) \leqq 200$ and more preferably are in a range that provides a viscosity for component (B) at 25° C. of 5 to 1,000 mPa·s. When (f+g) is less than the cited lower limit, the possibility exists, depending on the particular curing conditions, for component (B) to volatilize and for curing to then be unsatisfactory. Exceeding the cited upper limit creates the potential for a gel to be produced with elapsed time in bath form. f and g also preferably satisfy the relationship $1 \ g/(f+g)<1$. The basis for this is that the cure of the silicone-type pressure-sensitive adhesive composition according to the present invention may be unsatisfactory when $g/(f+g)$ is less than the cited lower limit.

More specifically, in each case having a viscosity at 25° C. of 5 to 1,000 mPa·s, the following is preferred examples of such a component (B): trimethylsiloxy-terminated methylhydrogenpolysiloxane at both molecular chain terminals, trimethylsiloxy-terminated dimethylsiloxane•methylhydrogensiloxane copolymer at both molecular chain terminals, trimethylsiloxy-terminated dimethylsiloxane•methylhydrogensiloxane•methylphenylsiloxane copolymer chain-stopped at both molecular chain terminals, dimethylhydrogensiloxy-terminated dimethylpolysiloxane at both molecular chain terminals, dimethylhydrogensiloxy-terminated dimethylsiloxane•methylphenylsiloxane copolymer at both molecular chain terminals, and dimethylhydrogensiloxy-terminated methylphenylsiloxane chain-stopped at both molecular chain terminals.

Component (B) is preferably incorporated in the silicone-type pressure-sensitive adhesive composition of the present invention in an amount sufficient to provide from 1 to 200 silicon-bonded hydrogen atoms per alkenyl group for the total silicon-bonded alkenyl present in the system. Insufficient curing may occur when the amount of component (B) incorporation is an amount that provides less than 1 silicon-bonded hydrogen atom per alkenyl group for the total silicon-bonded alkenyl present in the system, and a sticky residue may then appear on the adherend after holding at elevated temperature. When the amount of component (B) incorporation is an amount that provides more than 200 silicon-bonded hydrogen atoms per alkenyl group for the total silicon-bonded alkenyl present in the system, there may then be a tendency for component (B) to occur as a silicone residue. In order to realize an ultralow transfer behavior to a degree such that a silicone component cannot be visually observed on the adherend when re-pealing is carried out, component (B) is preferably incorporated in an amount that provides preferably 2 to 50 and more preferably 3 to 20 silicon-bonded hydrogen atoms per silicon-bonded alkenyl present in the system.

Component (C) is an organotitanium compound. It is one of the components that characterize the present invention and is an additive for the purpose of improving the adhesive strength for silicone rubber. The incorporation of this component (C) in the silicone-type pressure-sensitive adhesive composition of the present invention, a composition that is based on an organopolysiloxane condensation product, makes it possible to provide a silicone-type pressure-sensitive adhesive composition that exhibits a high adhesive strength for silicone rubber, that does not produce voids or a sticky residue when exposed to high temperatures after the application of the adherend, and that can also be easily peeled from silicone rubber.

The organotitanium compound (C) is a titanium complex that has an organic ligand and can be exemplified by titanate ester compounds, titanium alkoxide compounds, titanium chelate compounds having the acetylacetonate ligand or an alkyl acetoacetate-type ligand, titanium chelate compounds based on the silicic acid esters of titanium, titanium acylate compounds, and hydrolyzates of the preceding.

More specifically, component (C) is preferably an organotitanium compound represented by the following general formula (3) or general formula (4).

general formula (3): 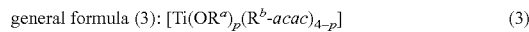 (3)

general formula (4):  (4)

$R^a$ in general formula (3) and general formula (4) is a monovalent organic group and is exemplified by monovalent organic groups selected from the group consisting of $C_{1-20}$ alkyl, $C_{6-20}$ aryl, $C_{7-20}$ aralkyl, and monovalent organic groups represented by the following structural formulas (5) to (8)

structural formula (5):

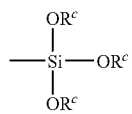
(5)

structural formula (6):

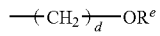
(6)

structural formula (7):

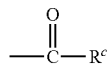
(7)

structural formula (8):

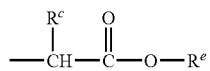
(8)

(in the formulas, $R^c$ is a group selected from $C_{1-20}$ alkyl, $C_{6-20}$ aryl, and $C_{7-20}$ aralkyl; $R^e$ is a group selected from the hydrogen atom, $C_{1-20}$ alkyl, $C_{6-20}$ aryl, and $C_{7-20}$ aralkyl; and d is a number in the range from 1 to 20).

$R^b$-acac in general formula (3) is the acetylacetonate ligand represented by $C_5H_7O_2$ or is an alkyl acetoacetate-type ligand represented by $C_4H_5O_2OC_qH_{2q+1}$ (in the formula, q is a number in the range from 1 to 10) and can be specifically exemplified by acetylacetonate represented by $C_5H_7O_2$ and ethyl acetoacetate represented by $C_6H_9O_3$.

p in general formula (3) is a number in the range from 0 to 4. r in general formula (4) is a number in the range from 0 to 2 and s is a positive number that is at least 2.

The following can be preferably used as component (C) in the present invention: titanium alkoxide compounds such as titanium tetraisopropoxide, titanium tetra-n-butoxide, titanium tetraoctoxide, titanium tetra-2-ethylhexoxide, butoxytitanium dimer, and so forth; titanium chelate compounds such as titanium diisopropoxybis(acetylacetonate), titanium tetraacetylacetonate, titanium dioctyloxybis(octylene glycolate), titanium diisopropoxybis(ethyl acetoacetate), titanium octyl glycolate, titanium lactate, titanium lactate ethyl ester, and so forth; titanium acylate compounds such as polyhydroxy titanium stearate and so forth; and the partial hydrolysis and condensation products of the preceding. Titanium alkoxide compounds and titanium chelate compounds that have the acetylacetonate ligand or an alkyl acetoacetate-type ligand are particularly suitable for use in the present invention, while titanium diisopropoxybis(ethyl acetoacetate) is most suitable for use in the present invention. The cited organotitanium compounds are commercially available as, for example, the ORGATIX (registered trademark, Matsumoto Trading Co., Ltd.) titanium series and can be easily acquired commercially.

A single organotitanium compound (C) may be used or two or more may be used in combination. Component (C) is incorporated in the range of 0.1 to 20 weight parts per 100 weight parts component (A) and preferably in the range of 0.5 to 10 weight parts per 100 weight parts component (A). The improvement in the adhesive strength for silicone rubber is insufficient when the amount of component (C) incorporation is less than the cited lower limit. At above the cited upper limit, the compatibility with component (A) deteriorates and component (C) may undergo separation with elapsed time.

Component (D) is a platinum catalyst and is a catalyst that promotes the hydrosilylation reaction between the silicon-bonded alkenyl present in the system, i.e., the alkenyl in component (A) and component (E), and the silicon-bonded hydrogen present in component (B). Specific examples of preferred platinum catalysts are chloroplatinic acid, alcohol-modified chloroplatinic acid, olefin complexes of chloroplatinic acid, chloroplatinic acid/ketone complexes, chloroplatinic acid/vinylsiloxane complexes, platinum tetrachloride, fined divided platinum powder, solid platinum supported on a carrier of alumina powder or silica powder, platinum black, olefin complexes of platinum, alkenylsiloxane (e.g., divinyltetramethyldisiloxane) complexes of platinum, carbonyl complexes of platinum, and platinum catalysts in the form of a thermoplastic organic resin powder (e.g., methyl methacrylate resin, polycarbonate resin, polystyrene resin, silicone resin, and so forth) that contains a platinum catalyst as exemplified above.

Component (D) is used in the present invention in an amount that provides from 1 to 1,000 ppm platinum metal in component (D) with reference to the total quantity of the composition and is preferably used in an amount that provides from 5 to 200 ppm platinum metal in component (D) with reference to the total quantity of the composition. When component (D) is used at less than the cited lower limit, the cure rate of the resulting silicone-type pressure-sensitive adhesive composition will be very slow and in some instances impractically so. When component (D) is used at above the cited upper limit, problems such as discoloration may be occurred in the resulting silicone-type pressure-sensitive adhesive composition.

The silicone-type pressure-sensitive adhesive of the present invention comprises the components (A) to (D) described hereinabove, but preferably additionally contains the component (E) represented by average structural formula (2) in order to prevent voids in those instances where exposure to high temperatures occurs after application of the adherend.

Average structural formula (2):

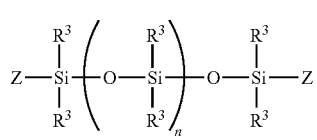
(2)

Component (E) is a reactive organopolysiloxane that has alkenyl or hydroxyl group in the molecule and that has a degree of polymerization n of less than 2000. Each $R^3$ in structural formula (2) independently designates $C_{1-10}$ unsubstituted or substituted monovalent hydrocarbyl and can be specifically exemplified by alkyl such as methyl and so forth; aryl such as phenyl and so forth; cycloalkyl such as cyclopentyl and so forth; aralkyl such as benzyl and so forth; $C_{2-10}$ alkenyl such as vinyl, allyl, butenyl, pentenyl, hexenyl, cyclohexenyl, and so forth; and groups yielded by the substitution of at least one hydrogen atom in the previously cited monovalent hydrocarbyl with a halogen atom (e.g., fluorine atom, chlorine atom, bromine atom, and so forth), the cyano group, and so forth. In addition, Z is a group selected from the hydroxyl group or $R^3$ and at least one among all the groups $R^3$ and Z is a reactive group selected from the hydroxyl group or $C_{2-10}$ alkenyl group.

One or both of the groups Z in structural formula (2) for component (E) is or are preferably $C_{2-10}$ alkenyl in the present invention and both are preferably vinyl or hexenyl group. In addition, from an industrial perspective, methyl comprises preferably at least 70% of all the $R^3$ groups and particularly preferably at least 90% of all the $R^3$ groups.

n in structural formula (2) for component (E) is a number in the range from 0 (inclusive) to less than 2000 and more preferably is a number in the range from 5 to 1000. This means that component (E) is a reactive organopolysiloxane that has a lower degree of Polymerization than the component (a) that is a starting material for component (A). When n exceeds the cited upper limit, the technical effect due to the incorporation of component (E), i.e., the prevention of voids in those instances where exposure to high temperatures occurs after application of the adherend, may be unsatisfactory. n is more suitably in a range that provides a viscosity at 25° C. for component (E) in the range of 10 to 10,000 mPa·s and more preferably 10 to 1,000 mPa·s.

Component (E) is incorporated in the range of 0.1 to 20 weight parts per 100 weight parts component (A) and more preferably in the range of 0.5 to 10 weight parts per 100 weight parts of component (A). When the quantity of component (E) incorporation is less than the cited lower limit, the technical effect due to the incorporation of component (E) may be inadequate. The objects of the present invention may be impaired when the quantity of component (E) incorporation exceeds the cited upper limit because the adhesiveness for silicone rubber may be inadequate and in addition component (E) may remain on the adherend in those instance where exposure to high temperatures occurs after application of the adherend.

Insofar as the objects of the present invention are not impaired, components other than (A) to (E) may optionally be incorporated in the silicone-type pressure-sensitive adhesive composition of the present invention. These other components can be exemplified by an organic solvent (F), a curing reaction inhibitor (G), heat stabilizers, pigments, and various other heretofore known additives.

An organic solvent can be incorporated as a component (F) in a freely selected quantity in the silicone-type pressure-sensitive adhesive composition of the present invention for the purpose of facilitating application to the substrate. This organic solvent (F) can be exemplified by aromatic hydrocarbon solvents such as toluene, xylene, and so forth; aliphatic hydrocarbon solvents such as hexane, octane, isoparaffin, and so forth; ketone solvents such as acetone, methyl ethyl ketone, methyl isobutyl ketone, and so forth; ester solvents such as ethyl acetate, isobutyl acetate, and so forth; ether solvents such as diisopropyl ether, 1,4-dioxane, and so forth; cyclic polysiloxanes having a degree of polymerization of 3 to 6, such as hexamethylcyclotrisiloxane, octamethylcyclotetrasiloxane, decamethylcyclopentasiloxane, and so forth; and halogenated hydrocarbons such as trichloroethylene, perchloroethylene, trifluoromethylbenzene, 1,3-bis(trifluoromethyl)benzene, methylpentafluorobenzene, and so forth. Aromatic hydrocarbon solvents such as toluene, xylene, and so forth and aliphatic hydrocarbon solvents such as hexane, octane, isoparaffin, and so forth are preferred and toluene and xylene are particularly preferred; mixtures of two or more solvents may also be used. While there is no particular limitation on the amount of organic solvent (F) incorporation, an amount that brings the content of components (A) to (E) in the composition into the range from 30 weight % (inclusive) to less than 100 weight % is preferred and the amount of organic solvent (F) incorporation is generally in the range of 5 to 200 weight parts per 100 weight parts of the total quantity of components (A) to (E).

The curing reaction inhibitor (G) is added in order to regulate the curing rate of the composition of present invention and can be specifically exemplified by alkyne alcohols such as 2-methyl-3-butyn-2-ol, 3,5-dimethyl-1-hexyn-3-ol, 3-methyl-1-pentyn-3-ol, 2-phenyl-3-butyn-2-ol, and so forth; eneyne compounds such as 3-methyl-3-penten-1-yne, 3,5-dimethyl-3-hexen-1-yne, and so forth; and alkenylsiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and so forth. This curing reaction inhibitor is incorporated in an amount effective for the moderation or regulation of the cure rate of the composition under consideration, and generally is incorporated preferably in the range of 0.001 to 5 weight parts per 100 weight parts of the total quantity of components (A) to (E). The cure rate of the resulting silicone-type pressure-sensitive adhesive composition is very slow when the curing reaction moderator is incorporated in an amount in excess of 5 weight parts per 100 weight parts of the total quantity of components (A) to (E).

An alkoxysilane compound may also be incorporated in the silicone-type pressure-sensitive adhesive composition; this alkoxysilane compound can be exemplified by tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltrimethoxysilane, allyltriethoxysilane, 3-glycidoxypropyltrimethoxysilane, 3-methacryloxypropyltrimethoxysilane, and so forth.

The silicone-type pressure-sensitive adhesive composition of the present invention can be produced by mixing the components (A) to (D) cited above, the optional components (E) to (G), and as necessary any other optional components. The individual components can be mixed to homogeneity by mixing at a temperature of 0 to 200° C. using any of various stirring devices or kneader/mixers. Mixing can be carried out with the application of heat as long as the component combination will not cure during this mixing process.

The sequence of incorporation of the individual components is not particularly limited as long as curing during mixing is avoided. When the composition will not be used immediately after mixing, in a preferred embodiment the composition is stored divided into a plurality of containers in such a manner that components (B) and (D) are not present in the same container and the components in all the containers are then mixed with each other immediately prior to use.

The silicone-type pressure-sensitive adhesive composition of the present invention can be formed into a pressure-sensitive adhesive layer on the surface of a substrate by coating the composition on the substrate and thereafter cured at room temperature or by heating at 50 to 200° C. The coating method here can be exemplified by gravure coating, offset coating, offset gravure, roll coating, reverse roll coating, air knife coating, curtain coating, and comma coating.

The pressure-sensitive adhesive sheet of the present invention is described in detail as follows. The pressure-sensitive adhesive sheet of the present invention is characteristically a pressure-sensitive adhesive sheet comprising a pressure-sensitive adhesive layer formed on a sheet-form substrate by the cure of the silicone-type pressure-sensitive adhesive composition according to the present invention as described above, and can be used as a pressure-sensitive adhesive film or pressure-sensitive adhesive tape depending on the type of sheet-form substrate.

The sheet-form substrate on which the pressure-sensitive adhesive layer is formed can be exemplified by paper or plastic film that has been subjected to a release treatment on one or both sides, for example, plastic films of polyester resin (e.g., polyethylene terephthalate resin and so forth), polyimide resin, and so forth; paper such as Japanese paper, paperboard, cardboard, clay-coated paper, polyolefin-laminated paper and particularly polyethylene-laminated paper, synthetic paper, and so forth; synthetic resin films of polyimide, polyethylene, polypropylene, polystyrene, polyvinyl chloride, polycarbonate, polyethylene terephthalate, or nylon; fabrics and textiles, such as natural fiber fabrics and textiles, synthetic fiber fabrics and textiles, artificial leather, and so forth; glass wool; and metal foils. Synthetic resin films are preferred thereamong, and heat-resistant synthetic resin films (e.g., polyimide, polyetheretherketone (PEEK), polyethylene naphthalate (PEN), liquid-crystal polyarylate, polyamideimide (PAI), polyethersulfone (PES), and so forth) are preferred in particular in those instances where heat resistance is required. The thickness of the sheet-form substrate is not particularly limited, but is generally about 5 to 300 ☐m. Moreover, in order to improve the adhesiveness between the support film and the pressure-sensitive adhesive layer, a sheet-form substrate may be used that has been subjected to a primer treatment, corona treatment, etching treatment, plasma treatment, or CCVD (Combustion Chemical Vapor Deposition) treatment like ITRO technology treatment.

The pressure-sensitive adhesive sheet can be produced by coating the silicone-type pressure-sensitive adhesive composition of the present invention on a sheet-form substrate as described above and then curing at room temperature or by heating to 50 to 200° C. to form a pressure-sensitive adhesive layer on the surface of the sheet-form substrate. The coating method used here can be exemplified by the same methods as cited above.

Curing of the silicone-type pressure-sensitive adhesive on the sheet-form substrate is preferably carried out with heating and heating at 80 to 200° C. is particularly preferred. While the coating rate will be established as a function of the particular application, it is typically 2 to 200 µm as the thickness of the pressure-sensitive adhesive layer post-cure and for masking tape applications is 5 to 50 µm as the thickness of the pressure-sensitive adhesive layer post-cure.

The pressure-sensitive adhesive layer comprising the silicone-type pressure-sensitive adhesive composition of the present invention has the following advantages: it exhibits an excellent adhesiveness in particular to silicone rubber; it does not permanently adhere after use; it does not produce a sticky residue even when exposed to high temperatures after the application of the adherend; and it enables facile peeling. This enables the facile production of a silicone rubber laminate in which this pressure-sensitive adhesive layer on the sheet-form substrate is laminated to silicone rubber.

The silicone rubber comprising the silicone rubber laminate of the present invention is not particularly limited; however, the use of addition reaction-cured silicone rubber with a hardness (hardness measured with a type A durometer according to JIS K 6253) in the range of 30 to 90 is particularly preferable because this provides excellent holding properties in the case of lamination with a paper or plastic film sheet-form substrate using the silicone-type pressure-sensitive adhesive of the present invention.

EXAMPLES

Examples and comparative examples are provided below in order to specifically describe the present invention; however, the present invention is not limited to the examples that follow. The viscosity values reported in the examples were measured at 25° C., and the properties and characteristics of the silicone-type pressure-sensitive adhesive compositions were measured as follows.

[Viscosity]

The viscosity was measured at 25° C. using a digital display viscometer (Vismetron model VDA2 from Shibaura Systems Co., Ltd.); a #1 or #2 rotor was installed and the measurements were taken at a rotor rotation rate of 60 rpm.

[Nonvolatile Content]

Approximately 2 g of the silicone-type pressure-sensitive adhesive composition was introduced into an aluminum dish (diameter approximately 50 mm) that had been weighed with precision scales and the weight was again taken using the precision scales. The weighed dish+composition combination was placed in a 150° C. oven, held there for 30 minutes, removed from the oven, and cooled to room temperature; the dish containing the composition was then reweighed. The nonvolatile content in the composition was determined from the obtained weight change.

[Adhesive Strength]

The silicone-type pressure-sensitive adhesive composition was coated on polyethylene terephthalate (PET) resin film; coating was carried out so as to provide a thickness of about 30 µm for the pressure-sensitive adhesive layer after curing. Coating was followed by heating for 3 minutes at 100° C. to produce a pressure-sensitive adhesive sheet. This pressure-sensitive adhesive sheet was subsequently applied using a laminator to a releasable polyethylene terephthalate film and ageing was carried out for 1 day at room temperature; a pressure-sensitive adhesive tape was then produced by cutting to a width of 20 mm. This pressure-sensitive adhesive tape was peeled from the releasable polyethylene terephthalate film and was press-bonded using a rubber roller at pressure of 2 kgf on an adherend consisting of a mirror-finished stainless steel plate (SUS304) or silicone rubber (hardness of 40°, 50°, or 70° as measured by a type A durometer according to JIS K 6253 from Nippon Tact Co., Ltd.). After standing for 30 minutes at room temperature, the pressure-sensitive adhesive tape bonded on the adherend was peeled off at an angle of 180° and a constant rate (300 mm/minute) using a tensile tester and the adhesive strength was measured.

[Void Generation/Sticky Residue after Exposure to High Temperatures]

The silicone-type pressure-sensitive adhesive composition was coated on polyimide (PI) resin film; coating was carried out so as to provide a thickness of about 30 µm for the pressure-sensitive adhesive layer after curing. Coating was followed by heating for 3 minutes at 100° C. to produce a pressure-sensitive adhesive sheet. This pressure-sensitive adhesive sheet was subsequently applied using a laminator to a releasable polyethylene terephthalate film and aging was carried out for 1 day at room temperature; a pressure-sensitive adhesive tape was then produced by cutting to a width of 20 mm. This pressure-sensitive adhesive tape was peeled from the releasable polyethylene terephthalate film and was press-bonded using a rubber roller at pressure of 2 kgf on an adherend consisting of a stainless steel plate (SUS304) that had been polished with #280 waterproof abrasive paper. The pressure-sensitive adhesive taped adherend was then aged for 2 hours in a 150° C. oven and was removed from the oven and held for 30 minutes at room temperature.

This pressure-sensitive adhesive taped adherend was subsequently submitted to a visual evaluation of the presence/absence of voids between the pressure-sensitive adhesive tape and the adherend. Then, using a tensile tester, the pressure-sensitive adhesive tape was peeled off at an angle of 180° and a constant rate (300 mm/minute) and the presence/absence of a sticky residue on the adherend was visually evaluated. This sticky residue was residual material from the cured silicone-type pressure-sensitive adhesive composition and was attached as bumps or protrusions of varying size on the surface of the adherend.

[Holding Force]

The silicone-type pressure-sensitive adhesive composition was coated on polyimide (PI) resin film; coating was carried out so as to provide a thickness of about 30 μm for the pressure-sensitive adhesive layer after curing. Coating was followed by heating for 3 minutes at 100° C. to produce a pressure-sensitive adhesive sheet. This pressure-sensitive adhesive sheet was subsequently applied using a laminator to a releasable polyethylene terephthalate film and ageing was carried out for 1 day at room temperature; a pressure-sensitive adhesive tape was then produced by cutting to a width of 10 mm. The pressure-sensitive adhesive side was applied, so as to provide an adhered area of 10 mm×20 mm, on an adherend consisting of a stainless steel plate (SUS304) that had been polished with #280 waterproof abrasive paper and a mark was made with a cutter. A 200 g weight was applied and holding in a 150° C. oven was carried out for 30 minutes followed by a return to room temperature once again. The holding strength of the adhesive layer was evaluated by measurement with an optical microscope of the distance (in mm, referred to below as the "slippage") slipped by the position of the mark made by the cutter. The length of the adhered region was a maximum of 10 mm, and an evaluation of "dropped" from the adherend was rendered in those instances where a weak holding strength resulted in a slippage of at least this amount.

Synthesis Example 1

The following were introduced into a 500-mL separable flask equipped with a stirrer, thermometer, and inlet port and were thoroughly stirred and dissolved at room temperature until homogeneity was achieved: 55.68 g of organopolysiloxane gum with the average molecular formula [HOMe$_2$SiO$_{1/2}$]$_2$(Me$_2$SiO)$_{4000}$ and 22.26 g of organopolysiloxane gum represented by [HOMe$_2$SiO$_{1/2}$]$_2$(Me$_2$SiO)$_{4000}$(MeViSiO)$_8$ (the preceding=component (a)), 171.69 g of a xylene solution that contained 65.0 weight % as solids of a methylpolysiloxane resin that contained 2.7 weight % of hydroxyl group (component (b)), and 54.15 g of toluene. Into this was introduced 0.48 g of a solution that contained 20 weight % of tetramethylguanidine 2-ethylhexanoate, followed by heating and stirring for 4 hours while heating at 70° C. Cooling to room temperature then gave a partial condensate solution (component (A)) that had a viscosity of 78,000 mPa·s and a nonvolatile content of 61.0%.

Synthesis Example 2

The following were introduced into a 500-mL separable flask equipped with a stirrer, thermometer, and inlet port and were thoroughly stirred and dissolved at room temperature until homogeneity was achieved: 55.68 g of organopolysiloxane gum with the average molecular formula [HOMe$_2$SiO$_{1/2}$]$_2$(Me$_2$SiO)$_{4000}$ and 22.26 g of organopolysiloxane gum represented by [HOMe$_2$SiO$_{1/2}$]$_2$(Me$_2$SiO)$_{4000}$(MeViSiO)$_8$ (the preceding=component (a)), 171.69 g of a xylene solution that contained 65.0 weight % as solids of a methylpolysiloxane resin that did not contain hydroxyl (component (b)), and 54.15 g of toluene. Into this was introduced 0.48 g of a solution that contained 20 weight % of tetramethylguanidine 2-ethylhexanoate, followed by heating and stirring for 4 hours while heating at 70° C. Cooling to room temperature then gave a silicone solution that had a viscosity of 88,800 mPa·s and a nonvolatile content of 69.1%.

Practical Example 1

The following were mixed to homogeneity into 101.26 weight parts of the silicone partial condensate solution (component (A)) prepared in Synthesis Example 1: 0.21 weight part of trimethylsiloxy-terminated methylhydrogenpolysiloxane at both molecular chain terminals (viscosity=20 mPa·s, component (B)), 2.0 weight parts of titanium diisopropoxybis(ethyl acetoacetate) (component (C), ORGATIX TC-750 from Matsumoto Chemical Industry Co., Ltd.), and 0.21 weight part of 1-ethynyl-1-cyclohexanol (component (G)). This was followed by the introduction with mixing of a 1,3-divinyl-1,1,3,3-tetramethyldisiloxane/chloroplatinic acid complex (component (D)) in an amount that provided 100 ppm of platinum metal in the complex with respect to the total weight of components (A) to (C), and also the introduction with mixing of 50 weight parts toluene, thereby yielding a silicone-type pressure-sensitive adhesive composition that had an organopolysiloxane component content of approximately 32 weight %. The viscosity of this silicone-type pressure-sensitive adhesive composition was measured. A pressure-sensitive adhesive tape was fabricated using this silicone-type pressure-sensitive adhesive; the adhesive strength and behavior with regard to voids and sticky residue after exposure to high temperatures were evaluated; and the results are reported in Table 1.

Practical Example 2

The following were mixed to homogeneity into 103.26 weight parts of the silicone partial condensate solution (component (A)) prepared in Synthesis Example 1: 0.21 weight part of trimethylsiloxy-terminated methylhydrogenpolysiloxane at both molecular chain terminals (viscosity=20 mPa·s, component (B)), 2.0 weight parts titanium diisopropoxybis(ethyl acetoacetate) (component (C), ORGATIX TC-750 from Matsumoto Chemical Industry Co., Ltd.), 4.0 weight parts of dimethylvinylsiloxy-terminated dimethylpolysiloxane at both molecular chain terminals (viscosity=360 mPa·s, component (E)), and 0.21 weight part 1-ethynyl-1-cyclohexanol (component (G)). This was followed by the introduction with mixing of a 1,3-divinyl-1,1,3,3-tetramethyldisiloxane/chloroplatinic acid complex (component (D)) in an amount that provided 100 ppm platinum metal in the complex with respect to the total weight of components (A) to (C) plus component (E), and also the introduction with mixing of 50 weight parts toluene, thereby yielding a silicone-type pressure-sensitive adhesive composition that had an organopolysiloxane component content of approximately 32 weight %. The viscosity of this silicone-type pressure-sensitive adhesive composition was measured. A pressure-sensitive adhesive tape was fabricated using this silicone-type pressure-sensitive adhesive; the adhesive strength and behavior with regard to voids and sticky residue after exposure to high temperatures were evaluated; and the results are reported in Table 1.

Comparative Example 1

The following were mixed to homogeneity into 25.98 weight parts of organopolysiloxane gum with the average molecular formula [ViMe$_2$SiO$_{1/2}$]$_2$(Me$_2$SiO)$_{4000}$: 57.23 weight parts of a xylene solution that contained methylpolysiloxane resin at 65.0 weight % as solids, 0.21 weight part of trimethylsiloxy-terminated methylhydrogenpolysiloxane at both molecular chain terminals (viscosity=20 mPa·s, component (B)), 66.58 weight parts of toluene (component (F)), and 0.21 weight part 1-ethynyl-1-cyclohexanol (component (G)). This was followed by the introduction with mixing of a 1,3-divinyl-1,1,3,3-tetramethyldisiloxane/chloroplatinic acid complex (component (D)) in an amount that provided 100 ppm of platinum metal in the complex with respect to the total weight of the aforementioned organopolysiloxane, methylpolysiloxane resin, and component (B), thereby producing a silicone-type pressure-sensitive adhesive composition that had an organopolysiloxane component content of approximately 33 weight %. The viscosity of this silicone-type pressure-sensitive adhesive composition was measured. A pressure-sensitive adhesive tape was fabricated using this silicone-type pressure-sensitive adhesive; the adhesive strength and behavior with regard to voids and sticky residue after exposure to high temperatures were evaluated; and the results are reported in Table 1.

Comparative Example 2

The following were mixed to homogeneity into 25.98 weight parts organopolysiloxane gum with the average molecular formula [ViMe$_2$SiO$_{1/2}$]$_2$(Me$_2$SiO)$_{4000}$: 57.23 weight parts of a xylene solution that contained methylpolysiloxane resin at 65.0 weight % as solids, 0.21 weight part methylhydrogensiloxane chain-stopped at both molecular chain terminals by trimethylsiloxy (viscosity=20 mPa·s, component (B)), 2.0 weight parts titanium diisopropoxybis (ethyl acetoacetate) (ORGATIX TC-750 from Matsumoto Chemical Industry Co., Ltd.), 68.05 weight parts toluene (component (F)), and 0.21 weight part 1-ethynyl-1-cyclohexanol (component (G)). This was followed by the introduction with mixing of a 1,3-divinyl-1,1,3,3-tetramethyldisiloxane/chloroplatinic acid complex (component (D)) in an amount that provided 100 ppm platinum metal in the complex with respect to the total weight of the aforementioned organopolysiloxane, methylpolysiloxane resin, and component (B), thereby producing a silicone-type pressure-sensitive adhesive composition that had an organopolysiloxane component content of approximately 33 weight %. The viscosity of this silicone-type pressure-sensitive adhesive composition was measured. A pressure-sensitive adhesive tape was fabricated using this silicone-type pressure-sensitive adhesive; the adhesive strength and behavior with regard to voids and sticky residue after exposure to high temperatures were evaluated; and the results are reported in Table 1.

Comparative Example 3

The following were mixed to homogeneity into 101.26 weight parts of the silicone solution prepared in Synthesis Example 2: 0.21 weight part of trimethylsiloxy-terminated methylhydrogenpolysiloxane at both molecular chain terminals (viscosity=20 mPa·s, component (B)), 2.0 weight parts of titanium diisopropoxybis(ethyl acetoacetate) (component (C), ORGATIX TC-750 from Matsumoto Chemical Industry Co., Ltd.), and 0.21 weight part of 1-ethynyl-1-cyclohexanol (component (G)). This was followed by the introduction with mixing of a 1,3-divinyl-1,1,3,3-tetramethyldisiloxane/chloroplatinic acid complex (component (D)) in an amount that provided 100 ppm of platinum metal in the complex with respect to the total weight of the aforementioned silicone solution prepared in Synthesis Example 2 plus components (B) and (C), and also the introduction with mixing of 50 weight parts of toluene, thereby producing a silicone-type pressure-sensitive adhesive composition that had an organopolysiloxane component content of approximately 32 weight %. The viscosity of this silicone-type pressure-sensitive adhesive composition was measured. A pressure-sensitive adhesive tape was fabricated using this silicone-type pressure-sensitive adhesive; the adhesive strength and behavior with regard to voids and sticky residue after exposure to high temperatures were evaluated; and the results are reported in Table 1. The test specimen fabricated using the composition of Comparative Example 3 had an unsatisfactory adhesive strength holding strength and as a result was completely peeled from the adhered region (10 mm) and dropped down. As a result, this was evaluated as "dropped (>10 mm)".

Comparative Example 4

The following were mixed to homogeneity into 99.79 weight parts of the silicone solution (component (A)) prepared in Synthesis Example 1: 0.21 weight part of trimethylsiloxy-terminated methylhydrogenpolysiloxane at both molecular chain terminals (viscosity=20 mPa·s, component (B)) and 0.21 weight part of 1-ethynyl-1-cyclohexanol (component (G)). This was followed by the introduction with mixing of a 1,3-divinyl-1,1,3,3-tetramethyldisiloxane/chloroplatinic acid complex (component (D)) in an amount that provided 100 ppm of platinum metal in the complex with respect to the total weight of components (A) and (B), and also the introduction with mixing of 50 weight parts of toluene, thereby producing a silicone-type pressure-sensitive adhesive composition that had an organopolysiloxane component content of approximately 33 weight %. The viscosity of this silicone-type pressure-sensitive adhesive composition was measured. A pressure-sensitive adhesive tape was fabricated using this silicone-type pressure-sensitive adhesive; the adhesive strength and behavior with regard to voids and sticky residue after exposure to high temperatures were evaluated; and the results are reported in Table 1.

TABLE 1

|  | Practical/Comparative example no. | | | | | |
|  | Practical Example | | Comparative Example | | | |
|  | 1 | 2 | 1 | 2 | 3 | 4 |
| viscosity [mPa · s] | — | 1380 | 1000 | 832 | 800 | 888 | 1490 |
| organopolysiloxane component content [%] | — | 31.8 | 31.6 | 32.6 | 32.5 | 31.8 | 32.5 |

TABLE 1-continued

| | | Practical/Comparative example no. | | | | | |
|---|---|---|---|---|---|---|---|
| | | Practical Example | | Comparative Example | | | |
| | | 1 | 2 | 1 | 2 | 3 | 4 |
| adhesive strength [g/20 mm] | 40° hardness silicone rubber | 480 | 450 | 18 | 335 | 340 | 260 |
| | 50° hardness silicone rubber | 740 | 650 | 25 | 600 | 510 | 380 |
| | 70° hardness silicone rubber | 860 | 820 | 36 | 810 | 940 | 500 |
| | mirror-finished SUS plate | 1500 | 1300 | 1160 | 1400 | 1620 | 1400 |
| voids | mirror-finished SUS plate | very slightly present | absent | absent | absent | absent | absent |
| sticky residue | polished SUS plate | absent | absent | absent | present | present | absent |
| holding strength: slippage [mm] | — | — | 0.1 | 0.1 | 0 | 0.1 | dropped (>10.0) | 0.1 |

The pressure-sensitive adhesive compositions of Examples 1 and 2 exhibited a high adhesive strength even to silicone rubber at all hardnesses (40°, 50°, and 70°); moreover, a sticky residue was not seen on the polished SUS plate when the pressure-sensitive adhesive tape was peeled off after application to the polished SUS plate and exposure to high temperatures. In Example 2, voids were not seen between the pressure-sensitive adhesive layer and the polished SUS plate after application to the polished SUS plate and exposure to high temperatures. Comparative Examples 1 to 4 gave high values for the adhesive strength versus mirror-finished SUS plate. However, Comparative Example 1 had a very low adhesive strength for silicone rubber, while in Comparative Example 2 a sticky residue was observed on the polished SUS plate after the heat-resistance test. With Comparative Example 3, not only was a sticky residue seen, but a very poor result was obtained for the holding strength. Comparative Example 4 has a lower adhesive strength for silicone rubber than the examples, although not as low as in Comparative Example 1. Based on the preceding, it may be understood that the pressure-sensitive adhesive compositions of the comparative examples are inferior to the examples in terms of at least one of the following: a lower adhesive strength, the presence of a sticky residue, and a lower holding strength.

INDUSTRIAL APPLICABILITY

The pressure-sensitive adhesive layer comprising the silicone-type pressure-sensitive adhesive composition of the present invention is characterized in particular by an excellent adhesiveness to silicone rubber. Due to this, the silicone-type pressure-sensitive adhesive composition of the present invention and the pressure-sensitive adhesive sheet according to the present invention are useful as a bonding technology for various articles comprised of silicone rubber and as a coating or covering technology for the purpose, for example, of protecting an article. In particular, the silicone rubber laminate of the present invention is very useful as a keypad for various electronic devices, as a thermal interface rubber sheet for use with, for example, electronic circuits, as a protective sheet for displays and so forth, as a splicing tape, as a masking tape, as an electrical insulating tape, as a building material that exhibits an excellent heat resistance and excellent design potential, and as an interior decorative material such as, for example, wall paper and so forth.

The invention claimed is:
1. A silicone-type pressure-sensitive adhesive composition comprising the following components (A), (B), (C), and (D):
   (A) 100 weight parts of organopolysiloxane condensation reaction product that has at least two $C_{2-10}$ alkenyl groups in the molecule and that is yielded by a condensation reaction between the following components (a) and (b) in the presence of component (c)
   (a) 20 to 80 weight parts of diorganopolysiloxane that has at least one hydroxyl group in molecular chain terminal position and that is represented by the following average structural formula (1)

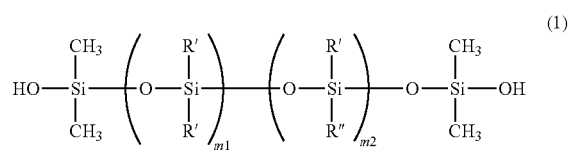

(1)

where in the above formula: each R' independently designates a group selected from a $C_{1-20}$ alkyl group, a $C_{6-20}$ aryl group, and a $C_{7-20}$ aralkyl group; R" is a $C_{2-10}$ alkenyl group; (m1+m2) is equal to a value of from 2000 to 10000; m2 is a positive number; and where 0<m2/(m1+m2) 0.05,
   (b) 80 to 20 weight parts of organopolysiloxane resin substantially comprising the $XR^2_2SiO_{1/2}$ unit (in the formula, X is a hydrolyzable group selected from the hydroxyl group or $C_{2-6}$ alkoxy groups and the $R^2$ groups independently designate $C_{1-10}$ unsubstituted or substituted monovalent hydrocarbyl groups), $R^2_3SiO_{1/2}$ unit (the $R^2$ groups are as previously defined), and $SiO_{4/2}$ unit, wherein the organopolysiloxane resin of component (b) contains from 0.5 to 10 wt. % hydroxyl groups, and (wherein the sum of component (a) and component (b) is 100 weight parts and at least two among all of the R" and $R^2$ groups are $C_{2-10}$ alkenyl groups)
   (c) a catalyst that promotes the condensation reaction, in a catalytic quantity;
(B) an organohydrogenpolysiloxane that contains at least two silicon-bonded hydrogen atoms in the molecule, in an amount sufficient to provide from 1 to 200 silicon-bonded hydrogen atoms per alkenyl group based on the total number of silicon-bonded alkenyl groups present in the silicone-type pressure-sensitive adhesive composition;
(C) an organotitanium compound, at from 0.1 to 20 weight parts; and
(D) a platinum catalyst in a catalytic quantity.

2. The silicone-type pressure-sensitive adhesive composition of claim 1, that further comprises
(E) 0.1 to 20 weight parts of organopolysiloxane that is represented by average structural formula (2) and that has $C_{2-10}$ alkenyl or the hydroxyl group at the molecular chain terminals average structural formula (2):

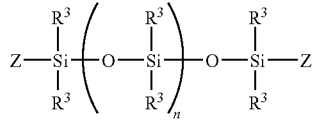

(2)

(in the formula, the $R^3$ groups independently designate $C_{1-10}$ unsubstituted or substituted monovalent hydrocarbyl group; Z is a group selected from the hydroxyl group or $C_{2-10}$ alkenyl group; and n is a number in the range from 0 (inclusive) to less than 2000).

3. The silicone-type pressure-sensitive adhesive composition of claim 2, wherein component (E) is organopolysiloxane that contains at least one $C_{2-10}$ alkenyl group in the molecule.

4. The silicone-type pressure-sensitive adhesive composition of claim 2, that further comprises
(F) organic solvent, in an amount such that the content of components (A) to (E) in the composition is in the range from at least 30 weight % to less than 100 weight %.

5. The silicone-type pressure-sensitive adhesive composition of claim 1, that further comprises
(F) organic solvent, in an amount such that the content of components (A) to (E) in the composition is in the range from at least 30 weight % to less than 100 weight %.

6. The silicone-type pressure-sensitive adhesive composition of claim 1, wherein component (C) is an organotitanium compound represented by the following general formula (3) or general formula (4)

general formula (3): $[Ti(OR^a)_p(R^b\text{-}acac)_{4-p}]$    (3)

(in the formula, $R^a$ is a monovalent organic group, $R^b$–acac is the acetylacetonate ligand represented by $C_5H_7O_2$ or is an alkyl acetoacetate-type ligand represented by $C_4H_5O_2OC_qH_{2q+1}$ (q in the formula is a number in the range from 1 to 10), and p is a number in the range from 0 to 4)

general formula (4): $R^aO\text{—}[Ti(OR^a)_r(OH)_{2-r}O]_s\text{—}R^a$    (4)

(in the formula, $R^a$ is a monovalent organic group, r is a number from 0 to 2, and s is a positive number with a value of at least 2).

7. The silicone-type pressure sensitive adhesive composition of claim 6, wherein component (C) is an organotitanium compound characterized in that $R^a$ in general formula (3) and general formula (4) is a monovalent organic group selected from the group consisting of $C_{1-20}$ alkyl, $C_{6-20}$ aryl, $C_{7-20}$ aralkyl, and the monovalent organic groups represented by the following structural formulas (5) to (8)

structural formula (5):

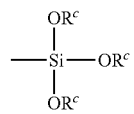

(5)

structural formula (6):

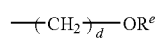

(6)

structural formula (7):

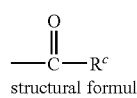

(7)

structural formula (8):

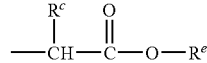

(8)

(in the formulas, $R^c$ is a group selected from $C_{1-20}$ alkyl, $C_{6-20}$ aryl, and $C_{7-20}$ aralkyl; $R^e$ is a group selected from the hydrogen atom, $C_{1-20}$ alkyl, $C_{6-20}$ aryl, and $C_{7-20}$ aralkyl; and d is a number in the range from 1 to 20).

8. A pressure-sensitive adhesive sheet comprising a sheet-form substrate and a pressure-sensitive adhesive layer formed thereon by the cure of a silicone-type pressure-sensitive adhesive composition according to claim 1.

9. A silicone rubber laminate comprising a pressure-sensitive adhesive layer formed by the cure of a silicone-type pressure-sensitive adhesive composition according to claim 1, a sheet-form substrate, and silicone rubber.

10. The silicone rubber laminate of claim 9, characterized in that the sheet-form substrate is paper or a plastic film and the silicone rubber has a hardness measured with a type A durometer in accordance with JIS K 6253 in the range of 30 to 90.

11. A method of producing a pressure-sensitive adhesive, the method comprising curing the pressure-sensitive adhesive composition of claim 1 at room temperature or by heating at 50 to 200° C.

12. The method of claim 11, wherein the pressure-sensitive adhesive composition further comprises
(E) 0.1 to 20 weight parts of organopolysiloxane that is represented by average structural formula (2):

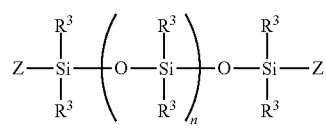

(2)

(in the formula, the $R^3$ groups independently designate $C_{1-10}$ unsubstituted or substituted monovalent hydrocarbyl group; Z is a group selected from the hydroxyl group or $C_{2-10}$ alkenyl group; and n is a number in the range from 0 (inclusive) to less than 2000).

13. The method of claim 12, wherein component (E) of the pressure-sensitive adhesive composition contains at least one $C_{2-10}$ alkenyl group in the molecule.

14. The method of claim 11, wherein the pressure-sensitive adhesive composition further comprises:
(F) organic solvent, in an amount such that the content of components (A) to (E) in the composition is in the range from at least 30 weight % to less than 100 weight %.

15. The method of claim 11, wherein component (C) of the pressure-sensitive adhesive composition is an organotitanium compound represented by the following general formula (3) or general formula (4)

general formula (3): $[Ti(OR^a)_p(R^b\text{-acac})_{4-p}]$ (3)

(in the formula, $R^a$ is a monovalent organic group, $R^b$-acac is the acetylacetonate ligand represented by $C_5H_7O_2$ or is an alkyl acetoacetate-type ligand represented by $C_4H_5O_2OC_qH_{2q+1}$ (q in the formula is a number in the range from 1 to 10), and p is a number in the range from 0 to 4)

general formula (4): $R^aO\text{-}[Ti(OR^a)_r(OH)_{2-r}O]_s\text{-}R^a$ (4)

(in the formula, $R^a$ is a monovalent organic group, r is a number from 0 to 2, and s is a positive number with a value of at least 2).

16. The method of claim 15, wherein component (C) is an organotitanium compound characterized in that $R^a$ in general formula (3) and general formula (4) is a monovalent organic group selected from the group consisting of $C_{1-20}$ alkyl, $C_{6-20}$ aryl, $C_{7-20}$ aralkyl, and the monovalent organic groups represented by the following structural formulas (5) to (8):

structural formula (5):

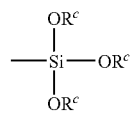
(5)

structural formula (6):

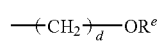
(6)

structural formula (7):

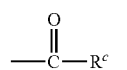
(7)

structural formula (8):

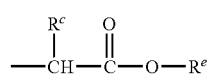
(8)

(in the formulas, $R^c$ is a group selected from $C_{1-20}$ alkyl, $C_{6-20}$ aryl, and $C_{7-20}$ aralkyl; $R^e$ is a group selected from the hydrogen atom, $C_{1-20}$ alkyl, $C_{6-20}$ aryl, and $C_{7-20}$ aralkyl; and d is a number in the range from 1 to 20).

* * * * *